US009193213B2

(12) United States Patent
Ponti

(10) Patent No.: US 9,193,213 B2
(45) Date of Patent: Nov. 24, 2015

(54) DYNAMIC BUFFER FOR A CONTINUOUS ENVELOPE STUFFING SYSTEM

(75) Inventor: Francesco Ponti, Citta di Castello (IT)

(73) Assignee: C.M.C. S.r.l., Cerbara-Citta di Castello (Perugia) (IT)

( * ) Notice: Subject to any disclaimer, the term of this patent is extended or adjusted under 35 U.S.C. 154(b) by 0 days.

(21) Appl. No.: 14/342,686

(22) PCT Filed: Sep. 6, 2012

(86) PCT No.: PCT/IB2012/054616

§ 371 (c)(1), (2), (4) Date: Mar. 4, 2014

(87) PCT Pub. No.: WO2013/035066

PCT Pub. Date: Mar. 14, 2013

(65) Prior Publication Data

US 2014/0216896 A1 Aug. 7, 2014

(30) Foreign Application Priority Data

Sep. 9, 2011 (IT) .............................. BO2011A0515

(51) Int. Cl.

*B65G 47/30* (2006.01)
*B43M 3/04* (2006.01)
*B65H 29/12* (2006.01)

(Continued)

(52) U.S. Cl.

CPC ............... *B43M 3/04* (2013.01); *B65H 29/125* (2013.01); *B65H 29/60* (2013.01); *B65H 39/10* (2013.01); *B65H 2301/4213* (2013.01); *B65H 2301/42262* (2013.01); *B65H 2301/4453* (2013.01); *B65H 2301/4454* (2013.01); *B65H 2301/4455* (2013.01); *B65H 2404/1122* (2013.01); *B65H 2511/50* (2013.01); *B65H 2513/40* (2013.01); *B65H 2801/66* (2013.01)

(58) Field of Classification Search

CPC ........................................................ B65H 29/60
USPC ........................................ 198/418.1; 271/303
See application file for complete search history.

(56) References Cited

U.S. PATENT DOCUMENTS 3,815,897 A 6/1974 Hoehl et al.
4,425,694 A 1/1984 Somerville (Continued)

FOREIGN PATENT DOCUMENTS

EP 1683751 A2 7/2006
WO WO03/035520 A2 5/2003

*Primary Examiner* — William R Harp
(74) *Attorney, Agent, or Firm* — R. Neil Sudol; Henry D. Coleman

(57) ABSTRACT

A dynamic buffer suitable for supplying piles from a cutting station to a continuous stuffing system has two storage levels, upper and lower, each having parking cells arranged in series for receiving, retaining and dispensing the piles. Each cell comprises two consecutive roller-counter-roller pairs, spaced by a distance smaller than a longitudinal extension of the piles, motorized in synchrony, suitable for adheringly gripping and drawing a pile; a sensor designed to detect whether each parking cell is free or occupied by a pile. An electronic managing and command unit receives signals provided by the sensor and pilots the flow of piles in inlet to the storage levels, transfers the piles to successive cells and enables outlet of the piles from the storage level, the electronic unit acting in phase relation with the cutting station and the stuffing system, such that the supply of the piles thereto has a cadence proportional to the operating velocity thereof.

13 Claims, 11 Drawing Sheets

(51) Int. Cl.
*B65H 29/60* (2006.01)
*B65H 39/10* (2006.01)

(56) References Cited

U.S. PATENT DOCUMENTS

| | | | | | |
|---|---|---|---|---|---|
| 5,435,534 | A | | 7/1995 | Linkowski | |
| 5,445,368 | A | * | 8/1995 | Lester et al. | 270/59 |
| 6,161,828 | A | | 12/2000 | Sussmeier | |
| 6,460,844 | B1 | * | 10/2002 | Clifford et al. | 271/9.13 |
| 6,644,657 | B2 | * | 11/2003 | Wright et al. | 271/242 |
| 6,687,569 | B1 | * | 2/2004 | Skinger et al. | 700/220 |
| 6,687,570 | B1 | * | 2/2004 | Sussmeier et al. | 700/220 |
| 6,792,332 | B1 | | 9/2004 | DePoi | |
| 7,121,544 | B2 | * | 10/2006 | Masotta et al. | 271/209 |
| 7,976,019 | B2 | * | 7/2011 | Masotta et al. | 271/209 |
| 8,157,261 | B2 | * | 4/2012 | Oota et al. | 271/270 |
| 8,690,153 | B2 | * | 4/2014 | Ponti | 271/303 |
| 2010/0096802 | A1 | | 4/2010 | Masotta | |

* cited by examiner

DYNAMIC BUFFER FOR A CONTINUOUS ENVELOPE STUFFING SYSTEM

FIELD OF THE INVENTION

The present invention relates to the technical sector of machines for automatic stuffing of correspondence, for example documents, printed advertising, or the like.

DESCRIPTION OF THE PRIOR ART

Among these are considered, in particular, those in which a continuous stuffing system which includes:

- unwinding a band of paper or plastic film from a reel and locating the band, stretched-out and horizontal, on a plane;
- continuous drawing of the band of paper or plastic film;
- sequenced infeed, above the band of paper or plastic film, of piles to be stuffed, with a cadence measured according to the advancement velocity of the band of paper or the plastic film;
- progressive winding of the band of paper or plastic film to form a continuous tubular package wrapping the piles;
- joining the superposed longitudinal flaps of the paper band or plastic film, by gluing or heat-welding;
- joining the superposed transversal strips of the band of paper or plastic film which are intercalated between a pile and a successive pile, by means of gluing or heat-welding;
- cutting, transversally of the tubular wrapping, in a centred position with respect to the transversal strips, for separating the single envelopes.

The cited stuffing system is faster with respect to others which use pre-formed envelopes; there is also an appreciable saving on the intrinsic costs of the pack.

The production of a continuous stuffing system can reach and exceed 20,000 envelopes per hour, after an adequate start-up stage and a gradual acceleration.

In general, any variation in velocity of the continuous stuffing system, either in acceleration or deceleration, must be done gently, due both to problems of inertia in the mechanisms and in order not to impart violent stresses on the tubular pack under formation, which would inevitably cause tearing or crumpling.

An optimal functioning of the above-described system is obtained, therefore, when the predetermined operating velocity is reached gradually (not necessarily top speed) and is then maintained as constant as possible.

The pile to be stuffed can be formed by a variable quantity of superposed personalised sheets, from a minimum of one up to about, for example, eight to ten.

The contents of the sheets are printed on a paper reel which is positioned at the initial part of the machine, and is then progressively unwound and sent to a cutting station, in which it is cut first longitudinally and then transversally in order to obtain the single sheets; all the sheets for a single addressee are then superposed in a storage station located downstream, to form a corresponding pile.

Further, downstream there can be a folding station which folds the piles, with a corresponding reduction of their size with respect to the advancing direction.

In a first operating mode of the folding station, the larger side of an A4 format sheet (the side going in the advancement direction) is reduced with a fold, defining a pile in C5 format; a second operating mode includes reducing the larger side to a third by means of two folds, defining a pile in DL format.

The folding station is absent in a case in which each sheet in A4 format is divided into three parts along the larger side, directly in the cutting station; from the cutting station the single sheets exit with dimensions corresponding to the DL format and in this form are superposed in the storage station to define a corresponding pile, also obviously in DL format.

The piles, whether in C5 format or in DL format, exhibit, downstream of the stations, the larger side orientated transversally to the advancement direction, while in a continuous stuffing system a 90°-turned orientation is required, i.e. with the larger side arranged longitudinally.

For these reasons, the initial part of the machine, in which the cutting, storing and possibly the folding stations are located, is arranged at 90° with respect to the line on which the continuous stuffing system is developed.

In the vertex zone formed between the initial part and the line, an exchange group is located such as to receive the piles coming from the upstream stations and supply them in outlet in a perpendicular direction to the infeed direction, causing at the same time the desired change in direction.

Along the transport line, which advances the piles towards the continuous stuffing system, one or more insert-dispensing devices (also known as automatic feeders) can be arranged in series, each able to associate a non-personalised supplementary sheet to each pile, for example a printed advertisement.

Piles with a plurality of sheets alternate with those having few sheets, in the order in which they have been printed on the reel; thus a relatively frequent variation in the time required for forming each pile is attained, according to the number of sheets to be superposed and in consequence of the fact that, in the cutting station, the blades operating transversally to the advancement direction cannot exceed a certain number of strokes per minute.

This situation determines, in a like machine configuration, an irregularity in the supply of piles to the continuous stuffing system which it is possible to absorb only by limiting the operating velocity thereof according to the time required for forming the piles which have a greater number of sheets, slowing down the initial part of the machine and thus the cutting station, when the piles are constituted by one or more sheets.

Thus, however, a significant part of the advantage of the continuous stuffing system is lost, of providing high-velocity and therefore limited costs.

If a stuffing system operating velocity is set that is greater than the minimum value determined with the above criteria, according to the arrival cadence of the piles, it would be necessary to continually slow down and speed up the arrival of the piles, with all the problems that this velocity variation lead to, and of which mention has been made.

As a further alternative, by leaving the stuffing system to function at this velocity, greater than the minimum value, there would be "holes" in the supply which would result in empty envelopes, unacceptable due both to reasons of waste and also to the fact that the tubular pack would be unstable, because of the empty lengths, with probability of jamming and the need for long machine down-times so that it can be reset.

SUMMARY OF THE INVENTION

The aim of the present invention is therefore to provide a dynamic buffer for a continuous stuffing system to be inserted upstream thereof and able to supply thereto the piles to be stuffed with a constant cadence, co-measured according to the set operating velocity, absorbing the time differences that are created for the preparation of piles with more or fewer sheets.

A further aim of the invention is to enable a continuous stuffing system, thanks to the presence of the buffer of the invention, to operate at a constant velocity, appreciably faster than the minimum calculated as if all the piles had the same maximum number of sheets.

A further aim of the invention relates to providing a buffer designed in such a way as to be able to function both with C5 piles and DL format without any structural modification.

A further aim of the invention consists in providing a buffer which, with respect to the basic technical solution, can be actuated in various embodiments and dimensioned according to the capacity and therefore the autonomy which is to be obtained.

A further advantage of the invention, is that it is possible to integrate, internally of the buffer, a storage device that using cut-to-measure sheets can form piles in DL format, without this compromising the functionalities with C5 format.

The above-mentioned aims are entirely attained by a dynamic buffer for a continuous stuffing system, of a of a type for supplying piles formed by one of more sheets to the stuffing system, the sheets coming from a cutting station provided in a supply line arranged upstream, the continuous stuffing system being of a type in which a film of flexible material is unwound from a reel, supplied stretched on a horizontal plane such as to receive thereon a sequence of the piles, and then progressively wound in a tube fashion in order to wrap the piles and subsequently cut in spaces separating each of the piles from a next pile, the buffer comprising:

at least a storage level, comprising a plurality of parking cells, arranged in series, suitable for receiving, retaining and dispensing the piles, within each cell being provided: at least two lower rollers having horizontal axes that are parallel and distanced by an amount which is less than a dimension of the piles and parallel to the advancement direction, the lower rollers being synchronously motorised, independently of the lower rollers of remaining parking cells; at least two upper rollers, idle on axes thereof, each of which is suitable for forming, with the corresponding lower rollers, a roller-counter-roller pair able to adheringly grip and draw one of the piles; sensor means suitable for detecting whether each parking cell is free or occupied by one of the piles;

electronic managing and command means, suitable to receive the signals supplied by the sensor means of each parking cell and to pilot a flow of the piles in inlet to the storage level up to bringing each of the piles to a most downstream parking cell, transferring the piles to the successive cells and finally allowing exit of the piles from the storage level, the electronic managing and commanding means acting in phase relation with the cutting station and the stuffing system, such that the supplying of the piles thereto is done with a cadence that is proportional to an operating velocity thereof.

The dynamic buffer of the present invention, thanks to the constructional peculiarities thereof, enables absorbing the time differences which relate to the preparation of the piles with one or more sheets by supplying the piles to be stuffed to the continuous stuffing system with a constant cadence.

This enables optimisation of the functioning of the system by preventing too many variations in velocity thereof, and the relative drawbacks which have been discussed, and without there being “holes” in supply of the piles.

The above advantages are attainable by maintaining, for the continuous stuffing system, a stable operating velocity, calibrated at an intermediate value between the minimum, obligatory if all the piles have the maximum number of sheets, and the maximum possible if all the piles have a minimum number of sheets; the operating velocity is therefore appreciably greater than what is possible without the presence of the buffer.

A further advantage of the buffer of the invention derives from the possibility of functioning both with C5-format piles and DL-format piles, with no structural modification, but simply by varying the electronic management program.

The technical solution which includes parking cells arranged in series, with the piles which are progressively transferred from the inlet from a cell to a next cells up to when they are dispensed in outlet, without the grip ever being released, enables easy realisation of buffers dimensioned as a function of the capacity, and therefore autonomy, which they are to be given.

The embodiment including integration, internally of the buffer, of a storage device for forming piles in DL format is particularly advantageous, when already-cut sheets are sent from the cutting station, without compromising the functionality either with folded DL-format piles or C5-format piles.

BRIEF DESCRIPTION OF THE DRAWINGS

The characteristics of the invention will emerge more fully from the following description of a preferred embodiment of the dynamic buffer of the invention, according to what is set down in the claims and with the aid of the accompanying tables of drawings, in which:

DESCRIPTION OF PREFERRED EMBODIMENTS

With reference to the above figures, 1 denotes the dynamic buffer object of the present invention, in its entirety.

The dynamic buffer 1 is destined to be associated to a machine M for automatic stuffing of correspondence, for example printed advertising material or the like.

The machine M is preferably of known type, as described in the preamble, including a supply line L arranged upstream and a continuous stuffing system C downstream, for packing piles P, the piles P being either in C5 format (A4 folded along the longer side) or DL (A4 folded or cut into three parts along the longer side).

Figure 5:
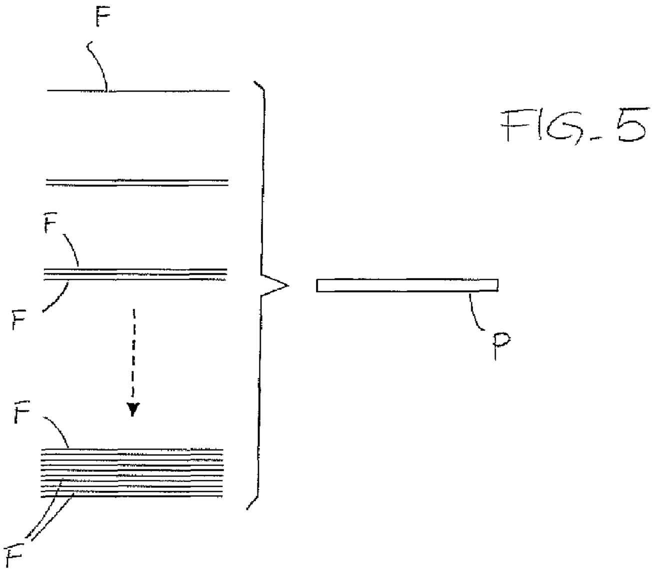
FIG. 5 illustrates, in a schematic view, the composition of a pile to be stuffed.

The pile P can be made up of a variable quantity of superposed personalised sheets F, from a minimum of one to about, for example, 8 to 10 (see in particular FIG. 5); in the machine M, downstream of the buffer 1 and immediately upstream of the continuous stuffing system C, known dispensing devices B can be present, known as automatic feeders, arranged in series, each of them being suitable for attaching an insert to the piles P transiting beneath; the inserts, and the modes with which they are attached to the piles P, are not illustrated as they are not included in the present invention.

As amply described in the preamble, the sheets F are made by cutting, first longitudinally and then transversally, of a continuous strip, unwound from a reel (not illustrated) and sent to a station ST, comprised in the supply line L, in which a known-type cutting group operates (also not illustrated).

The sheets F to be directed to a single addressee are therefore superposed in a storage station SA located downstream such as to form a corresponding pile P.

In order to obtain piles P of the C5 format or the DL format with the folded sheets F, the sheets F are stored in the whole A4 format, and the piles P folded in a folding station SP located immediately downstream of the storage station SA.

By folding the superposed sheets F in half, piles P in C5 format are obtained, while by folding them into three parts DL format piles are obtained.

In order to obtain piles P of DL format, with the sheets F cut to measure, they are cut using the transversal cutting means associated to the cutting station ST; in this case the folding station SP is absent.

The buffer 1 is destined to be positioned downstream of the stations present in the supply line L and is suitable for receiving and dispensing the piles P, whether they are in C5 format or in DL format, with a horizontal lie and with the larger side orientated transversally to the advancement direction.

As mentioned in the preamble, this leads to an arrangement angled by 90° between the two parts of the machine M, the first of which comprises the supply line L and the buffer 1 and the second of which comprises the continuous stuffing system C (FIGS. 4 and 8), as well as the presence, immediately downstream of the buffer 1 itself, of an exchange group GS destined to receive the piles P, arranged as indicated, and to supply them in outlet in a perpendicular direction to the inlet direction, thus at the same time determining the desired change of orientation, with the larger side parallel to the advancement direction.

The buffer 1 comprises at least a storage level 2, constituted by a plurality of parking cells 3, arranged in series, suitable for receiving, retaining and dispensing the piles P, as specified herein below.

In a preferred embodiment of the buffer 1, with reference to the figures, two superposed storage levels are comprised, respectively upper 2A and lower 2B, and switcher means 20 positioned upstream thereof, suitable for directing the piles P in inlet towards one or another of the storage levels 2A, 2B.

Figure 7A:
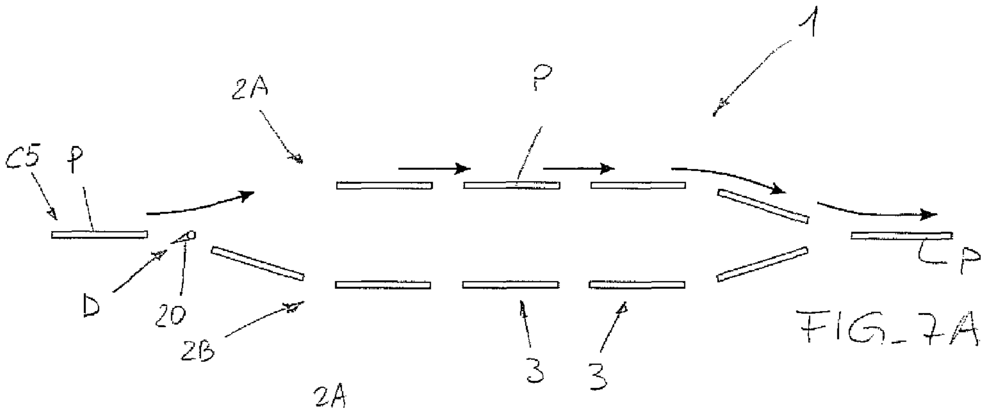
FIGS. 7A and 7B are two schematic views relating to possible operating modes of the buffer with C5 format piles.
Figure 12A:
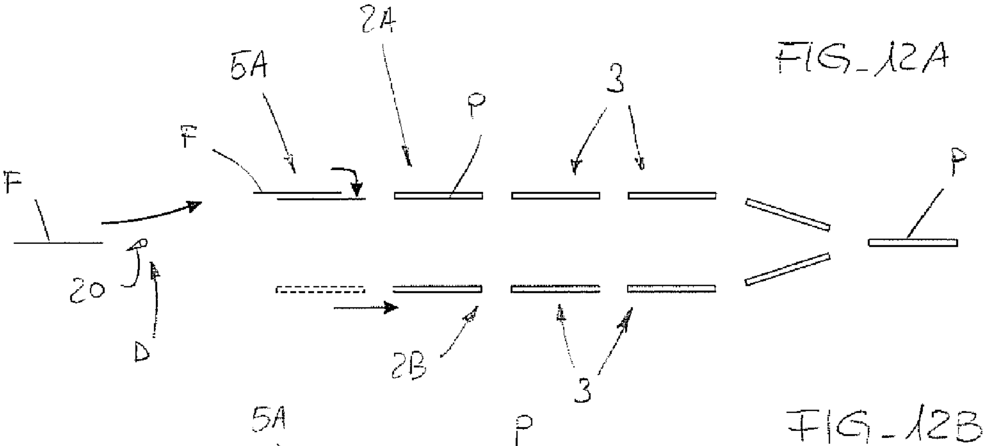
FIGS. 12A, 12B, 12C, 12D are four schematic views relating to a possible functioning mode of the buffer with DL format piles.

The switcher means 20 are constituted, for example, by a deflector that is hinged according to a horizontal axis that is transversal to the arrival direction of the piles P, and is made mobile by action of the actuator means between a raised position H in which the piles P are directed downwards (FIGS. 2, 7B, 12C, 12D), and a lowered position D (FIGS. 7A, 12A, 12B) in which the piles P are directed upwards.

Detecting means 204 are associated to the switcher means 20, which detecting means 204 are destined to signal arrival of a pile P at the inlet of the buffer 1 (FIGS. 1, 2, 6, 10, 11).

The upper storage level 2A is constituted by: a rising inlet tract 21A in which drawing means 210A are provided; a horizontal tract 22A along which the parking cells 3 are distributed in succession; and a descending outlet tract 23A, in which drawing means 230A are provided.

Likewise, the lower storage level 2B comprises: a descending inlet tract 21B in which drawing means 210B are provided; a horizontal tract 22B along which the parking cells 3 are distributed in succession; a rising outlet tract 23B in which drawing means 230B are provided.

Each of the parking cells 3 comprises:

at least two lower rollers 30 having horizontal axes distanced by a lower amount than the dimension of the piles P parallel to the advancement direction, the lower rollers 30 synchronously motorised independently with respect to the lower rollers 30 of the remaining parking cells 3;

at least two upper rollers 31, idle on the axis thereof, each of which is destined to form, with the corresponding lower roller 30, a roller-counter-roller pair 32 able to adheringly grip and draw one of the piles P;

sensor means 34 destined to detect whether each parking cell 3 is free or occupied by one of the piles P.

In the illustrated constructional solution: each of the lower rollers 30 is split into two coaxial rollers, like the respective upper roller 31, so that each roller-counter-roller pair 32 is in reality constituted by four rollers.

The upper rollers 31 advantageously exhibits an elastically-yielding structure in a radial direction, suitable for absorbing a difference of thicknesses between a pile P constituted by a single sheet F and constituted also by a plurality of sheets F.

The interaxis between a roller-counter-roller pair 32 and the other in the same parking cell 3 is, in particular, smaller than the dimension of the DL format parallel to the advancement direction of the piles P, and likewise the interaxis between the roller-counter-roller pair 32 arranged more downstream in a parking cell 3 and the first roller-counter-roller pair 32 upstream of the next parking cell 3 is similarly dimensioned.

It is to be pointed out that the described constructional solution including two roller-counter-roller pairs 32 for each parking cell 3 is included because in this way a greater dimension thereof is obtained in the advancement direction of the piles P, which is useful also for containing the piles P in C5 format and preventing two piles P, of any format, parked in two successive cells 3, from having mutually-superposed zones.

In a preferred embodiment of the buffer 1, the drawing means 210A, 210B present in the inlet tract 21A, 21B, and the drawing means 230A, 230B, present in the outlet tract, are constituted by roller and counter-roller systems, in which one is motorised while the other is idle; the idle roller is constituted by the same component as used for the upper rollers 31 of the parking cells 3, and therefore elastically yielding in a radial direction.

The interaxis between the roller and counter-roller systems of the drawing means 210A, 210B, 230A, 230B is fixed at a like value to the one established for the parking cells 3.

With these characteristics, the pile P in DL format, in any position in the transit along the relative storage level 2, is also always locked in the grip of at least a pair or a roller-counter-roller system.

Sensor means 24 similar to those of the parking cells 2, suitable for detecting the transit of the piles P are associated to each of the drawing means 210A, 210B, 230A, 230B.

Figure 6:
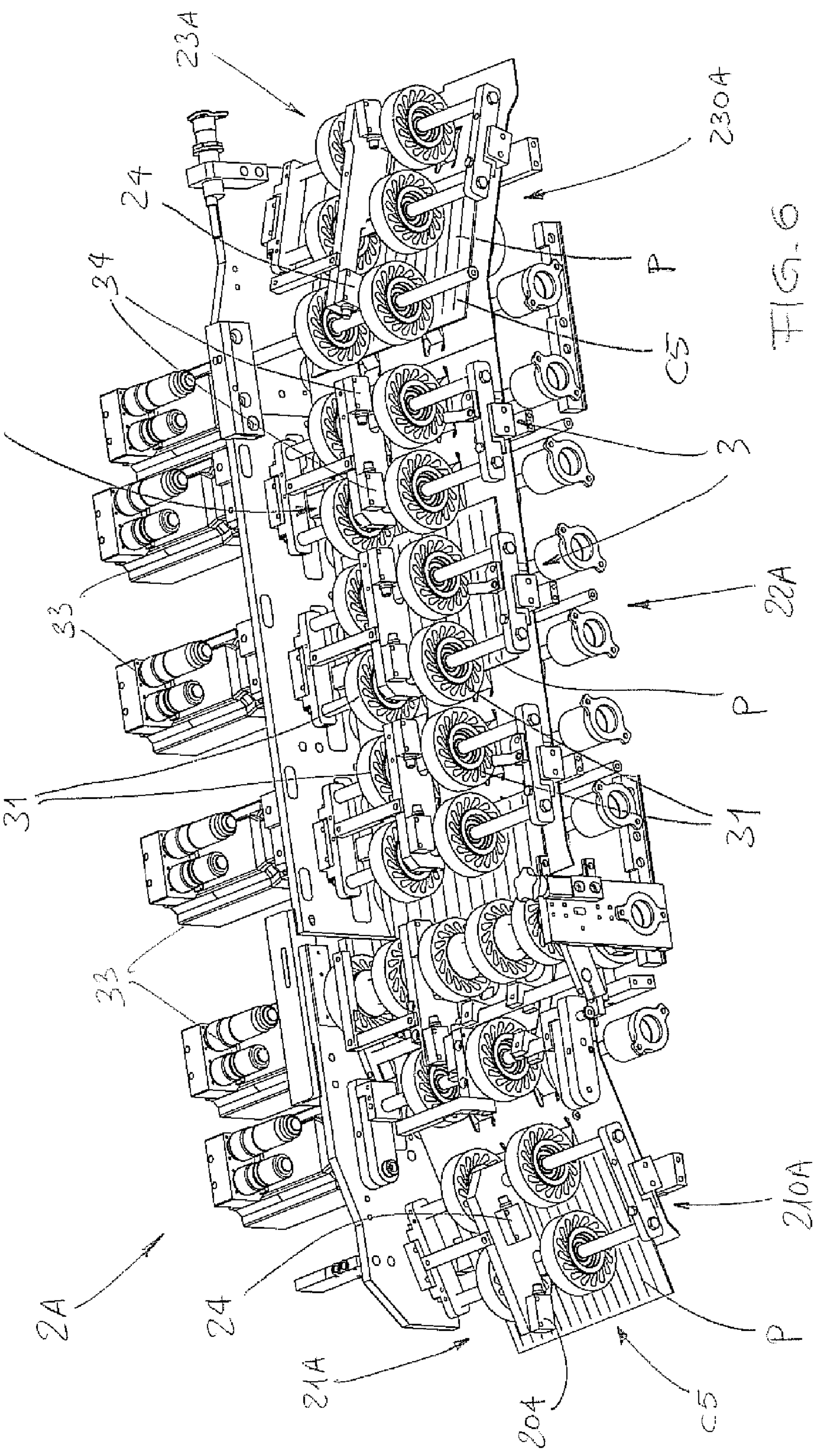
FIG. 6 illustrates, in an axonometric view, the upper storage of the buffer, in which piles of a C5 format are present.

The conformation of the drawing means 210A, 210B, 230A, 230B enables using them not only for the normal functions of movement of the piles P in inlet and in outlet, also as a same number of parking cells, such as to increase the capacity, and consequently the autonomy of the buffer 1; FIG. 6 shows the upper storage level 2A.

In the accompanying figures, both the upper storage level 2A and the lower storage level 2B are provided, in an optional embodiment of the buffer 1, with a respective storage station 5A, 5B interposed between the corresponding inlet tract 21A, 21B and the relative parking cells 3, suitable for receiving a predetermined succession of single sheets F in DL format, supplied in inlet to the buffer 1, and to superpose them for formation of a corresponding pile P as well as being destined to transfer the pile P to the parking cell 3 immediately downstream.

Figure 11:
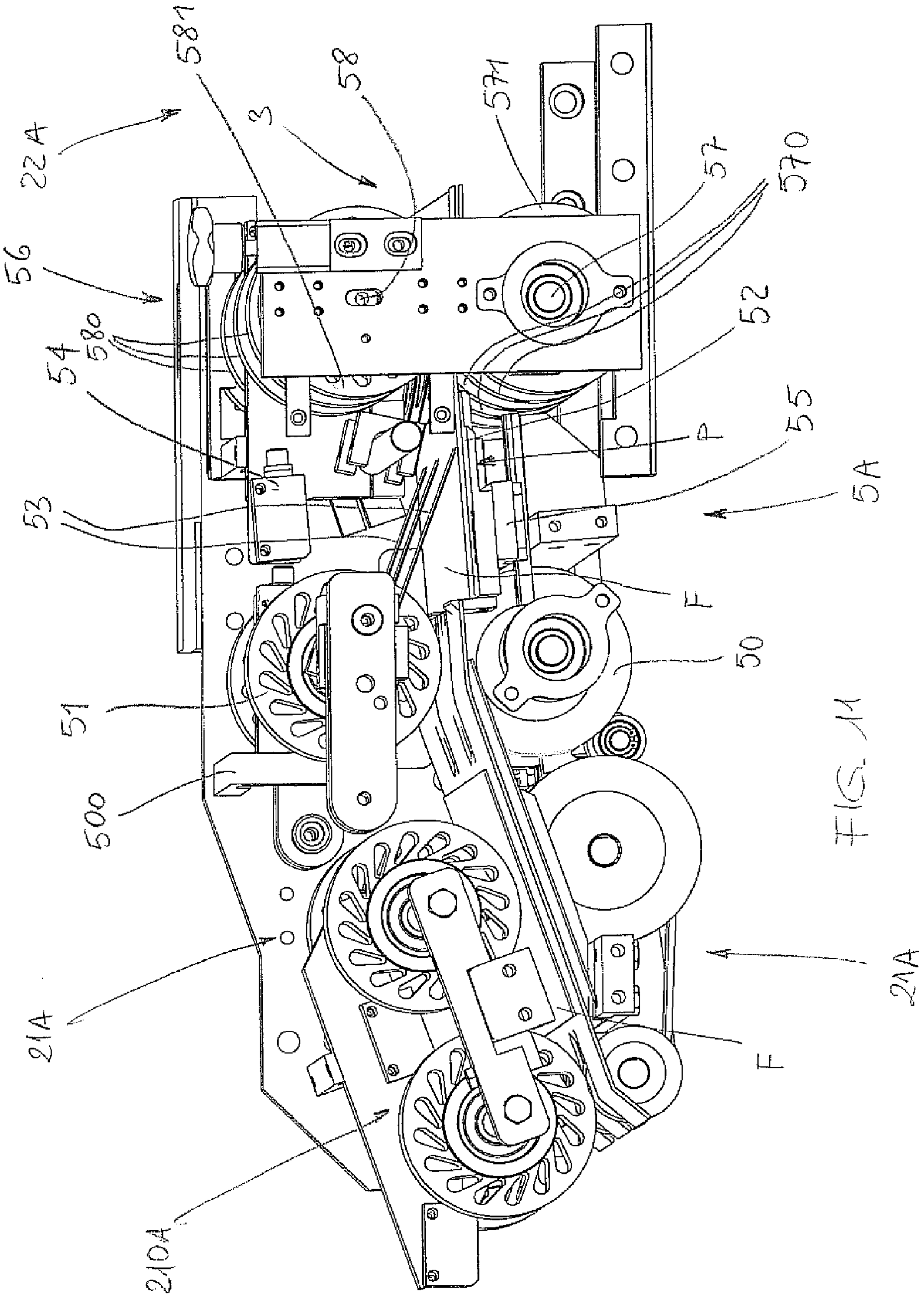
FIG. 11 is a larger-scale view of an optional storage station for forming DL format piles internal of the buffer.

FIG. 11 illustrates in detail the storage station 5A relative to the upper storage level 2A, which comprises, like station 5B:

- at least a lower drive roller 50, coupled to at least an idle upper roller 51, for sending sheets F in arrival to a tray 52 arranged at a lower level with respect to the level with which the rollers 50, 51 engage the sheet F;
- elastic plates 53, suitable for directing the sheets F in arrival in a downwards direction and for maintaining the pile P in formation on the tray 52;
- sensor means 54 suitable for detecting arrival of each of the sheets F;
- a carriage 55, which bears the tray 52, made horizontally mobile between a retracted position, in phase relation with the formation of the pile P, and an advanced position, for delivery of the pile P once it is completed;
- a roller transport group 56, arranged downstream of the tray 52, suitable for receiving the just-completed pile P and for transferring the said pile P to the parking cell 3 immediately downstream, maintaining unaltered the reciprocal position of the sheets F making up the pile P.

The lower drive roller 50 and the upper idle roller 51 are borne by a common support 500 that is horizontally adjustable, in order to define two positions for the rollers 50, 51, respectively:

- a retracted position (FIG. 11), in which a free space comprised between the rollers 50, 51 and the roller transport group 56 located downstream has a length which is greater than the dimension of the DL format in the advancement direction of a pile P and smaller than the corresponding dimension of a pile P of a C5 format;
- an advanced position (not illustrated), in which the free space comprised between the rollers 50, 51 and the roller transport group 56 has a shorter length than a dimension of the DL format in the advancement direction.

The transport group 56 comprises:

- a lower drive shaft 57, on which two lower central rollers 570 are keyed, suitable for acting below the pile P, and at least a transmission roller 571 (two in the example) external of the pile P;
- an upper drive shaft 58 parallel to the lower drive shaft 57, on which upper central rollers 580 are keyed, arranged at the lower central rollers 570 and destined to act above the pile P, and at least an upper transmission roller 581 (two in the example), destined to receive drive from the lower transmission roller 571, for example by friction, and to activate in rotation the upper shaft 58, as well as the upper central rollers 580 in an opposite direction and with a transmission ratio that is alike with respect to the rollers of the lower shaft 57 and the lower central rollers 570.

The upper central rollers 580 exhibit an elastically yielding structure in a radial direction, like the upper rollers 31 of the parking cells 3, for absorbing differences of thickness existing between a pile P and another; the deformation of the structure does not influence the drawing of the upper transmission roller 581, which is external of the thickness of the pile P, and, consequently, does not influence the rotation of the upper central rollers 580.

In a constructional variant, the transmission rollers 571, 581, can be constituted by a same number of gears.

With the counter-rotating rotation induced in the upper central rollers 580, the pile P borne by the tray 52, at the moment of entry into the transport group 56, is taken, gripped and drawn with a synchronised action, both above and below, preventing the "scaling" of the sheets F which it is made of, i.e. their becoming dealigned in the advancement direction.

Figure 8:
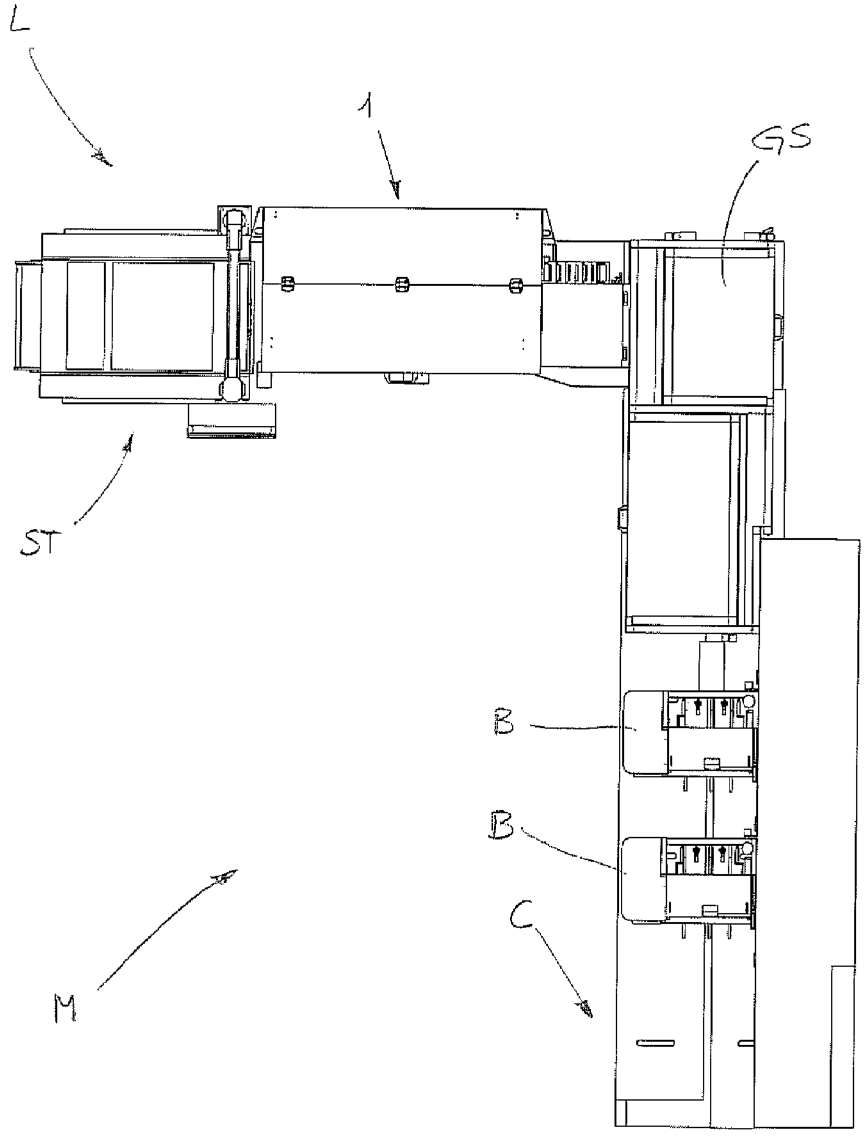
FIG. 8 is a plan view of a second lay-out relating to a machine for automatic stuffing in which the buffer of the invention is inserted.

The presence of the buffer stations 5A, 5B internally of the buffer 1 enables, for DL-format piles P with cut sheets, a reduction in the overall size of the machine M, by flanking the cutting station ST directly to the inlet of the buffer (FIG. 8).

Electronic managing and command means 10 are comprised in the buffer 1, which are suitable for receiving the signals provided by the sensor means 204 at the inlet, the signals provided by the sensor means 34 of each parking cell 3, the signals provided by the sensor means 24 of the drawing means 210A, 210B, 230A, 230B as well as the signals supplied by the sensor means 54 of the buffer stations 5A, 5B if present, and to pilot the flow of the piles P during the inlet, storage and outlet stages, as described in detail in the following.

Figure 1:
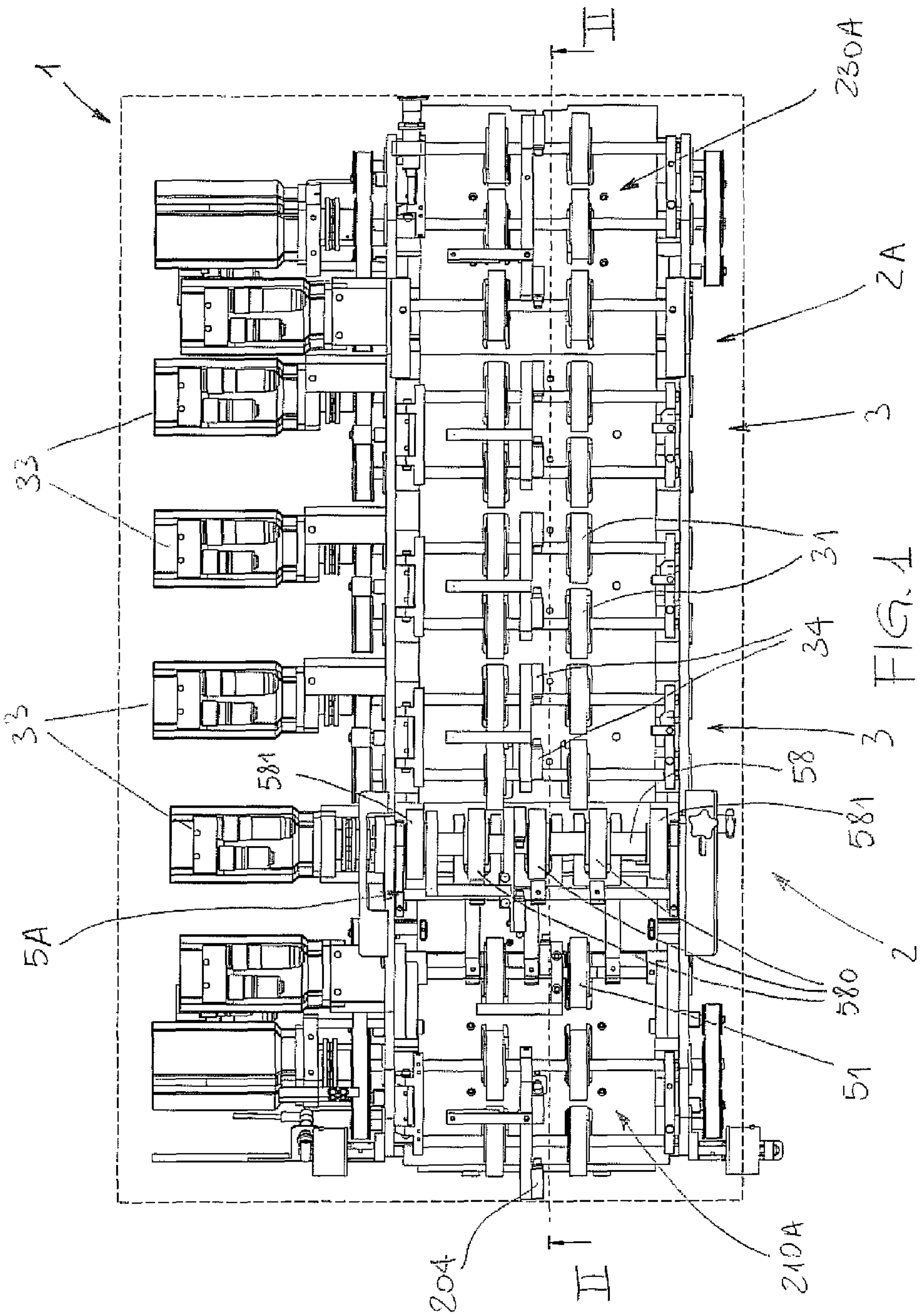
FIG. 1 illustrates a plan view of the buffer, without the relative containing structure.
Figure 2:
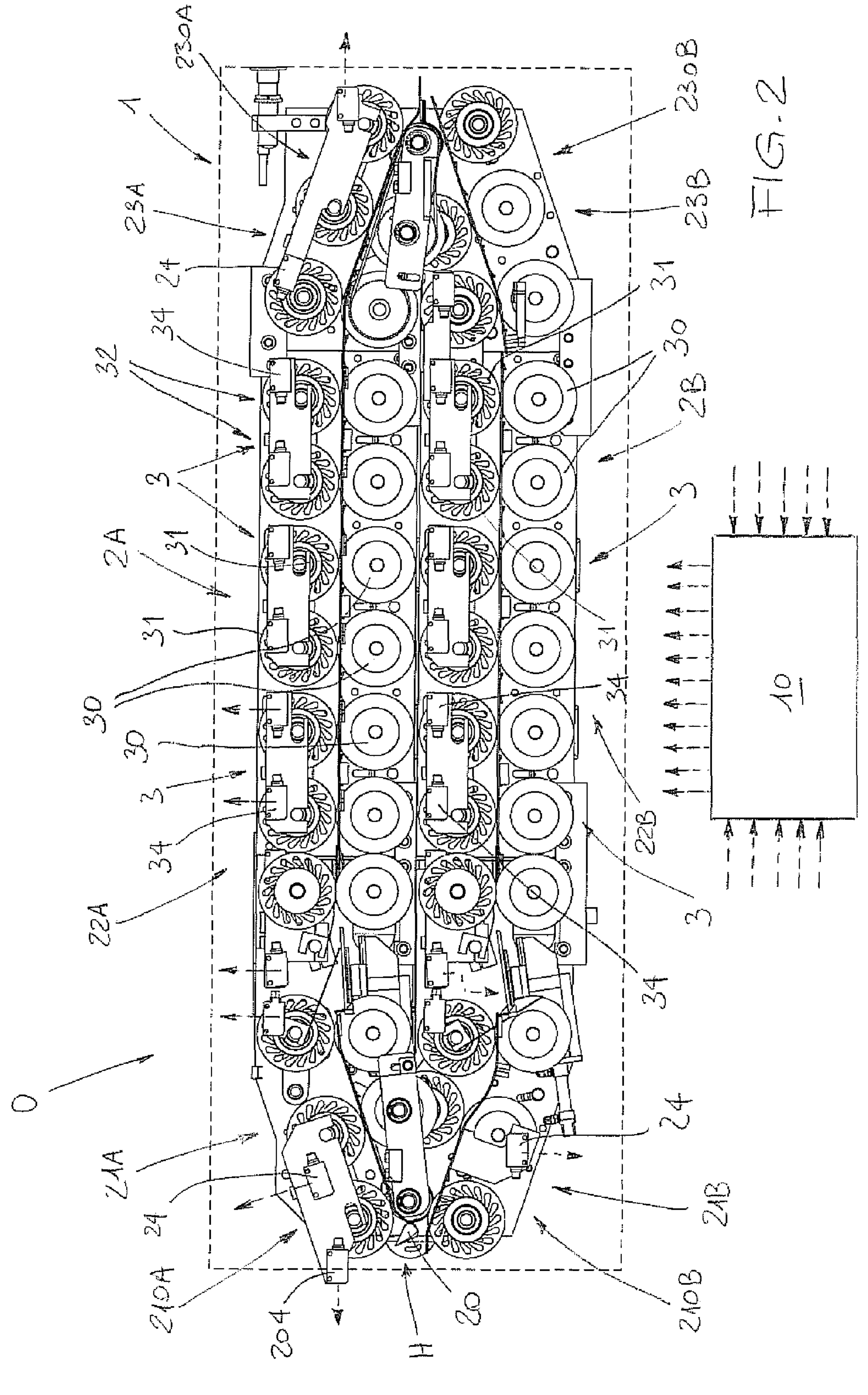
FIG. 2 is a longitudinal section of the buffer along plane II-II of FIG. 1.
Figure 3:
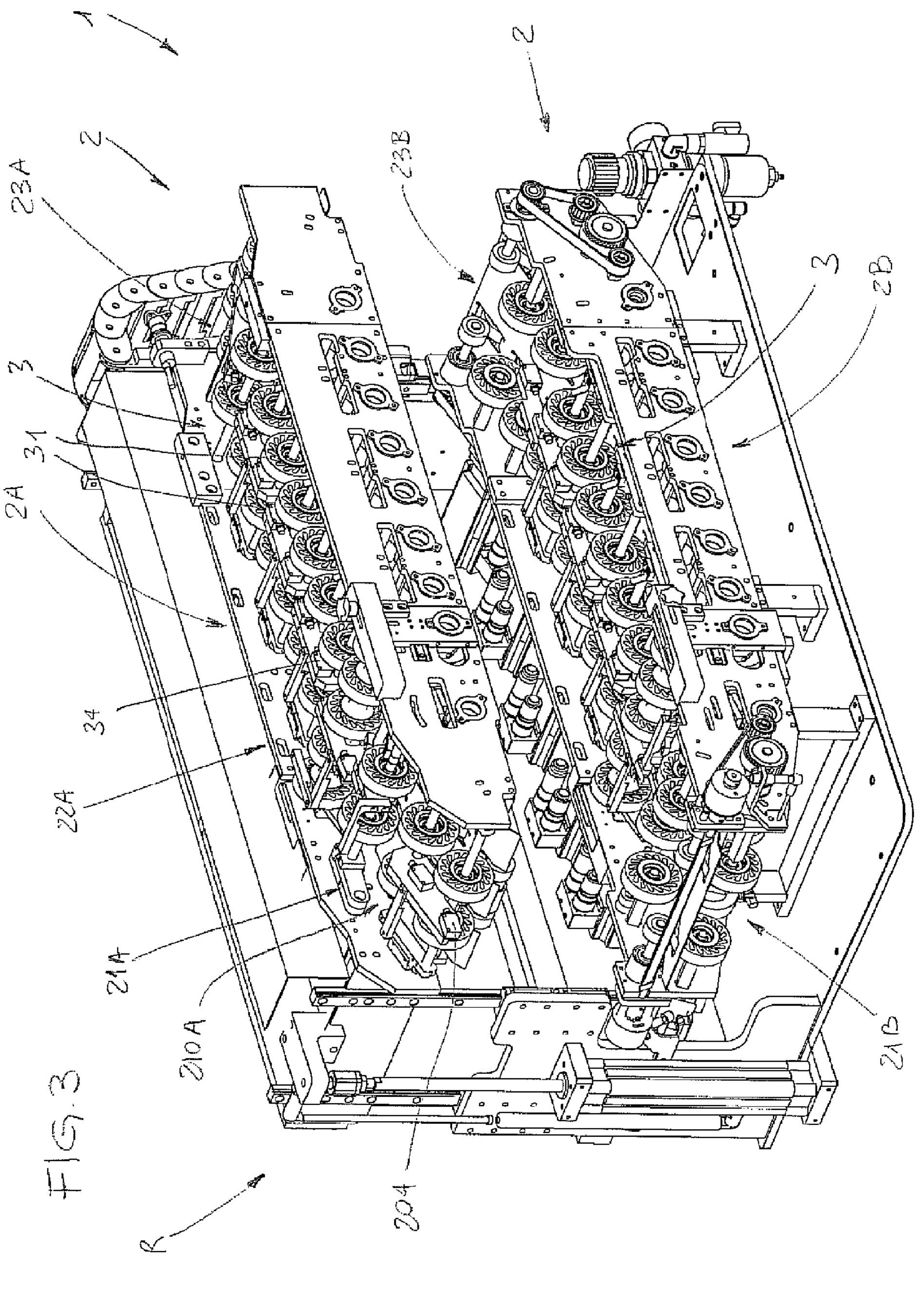
FIG. 3 illustrates an axonometric view of the buffer, open in the inspection configuration.

The bearing structure of the buffer 1, for the described embodiment with two superposed storage levels 2A, 2B, is advantageously conformed such that from the closed operating configuration O, visible in FIG. 2, it is possible to pass to a non-operative open configuration R, illustrated in FIG. 3, which allows inspection and maintenance of all the means and/or devices as well as the possible removal of jammed piles P.

Figure 4:
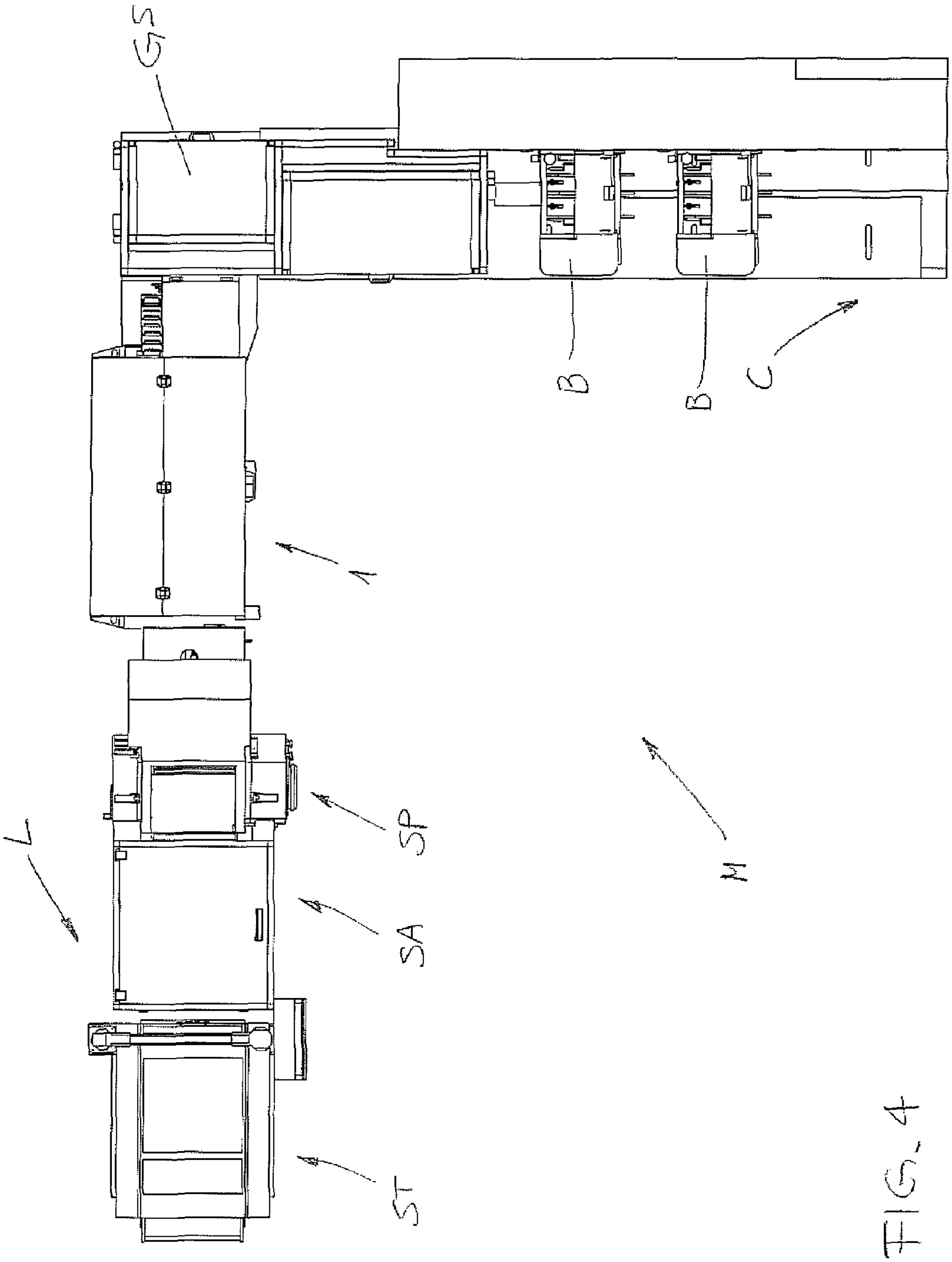
FIG. 4 is a plan view of a first lay-out relating to a machine for automatic stuffing in which the buffer of the invention is included.

There now follows a possible operating mode of the buffer 1, with piles P in C5 format, relative to the configuration of the machine M illustrated in FIG. 4, which includes, upstream and in order, the cutting station ST, with the relative longitudinal and transversal cutting group, and a module comprising the storage station SA and folding station SP.

A preliminary step includes:

establishing the operating velocity to impress on the continuous stuffing system C, calibrating it at an intermediate value between a minimum, calculated as if all the piles P had the maximum number of sheets F, and a maximum, calculated as if all the piles has a single sheet F; in the definition of the standard operating velocity, a useful parameter can be the order of succession among the piles P, then the number of sheets F, contained in an identifying file of the reel which is installed in the machine;

setting the electronic managing and command means 10 according to the type of piles P to be treated, in this case for the C5 format, and the exit cadence thereof, measured with the selected operating velocity for the stuffing system C;

preparing, at a slower velocity, a number of piles P sufficient to fill the buffer 1 as well as the portion of line up to the inlet in the stuffing system C.

At this point the machine M could be started up, which, with a gradual acceleration and synchronised with all its components, comprising the buffer 1, is brought up to the standard predetermined velocity.

When at working velocity, the piles P reach the inlet of the buffer 1, from the folding station SP, with a variable cadence, faster if constituted by one or only a few sheets F and slower in the opposite case.

Figure 7B:
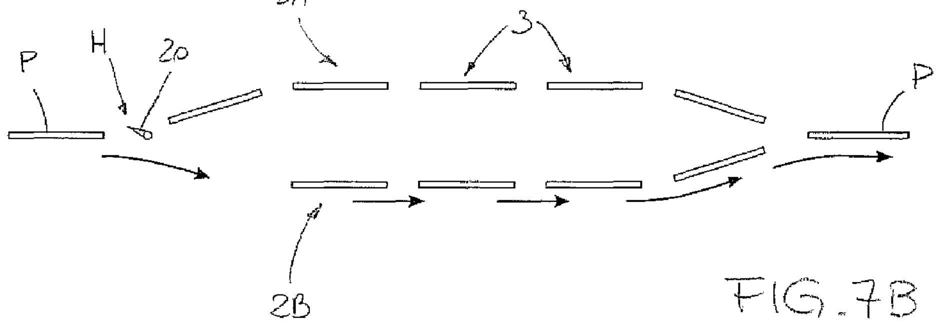

The arrival of each pile P is signalled by the detecting means 204, the signal of which, supplied to the electronic managing and command means 10, enables activating, alternatively and in appropriate phase relation, the switcher means 20 between the lowered position D thereof, in which the pile P is directed upwards (FIG. 7A) and the raised position H, in which the pile P is directed downwards (FIG. 7B).

When the pile P in inlet is directed to the upper storage level 2A (FIG. 6, 7A), the electronic managing and command means 10, on the basis of the signals supplied by the sensor means 24 of the drawing means 210A, 230A, as well as the sensor means 34 of each parking cell 3, activate, in appropriate sequence and phase relation, the respect motors such as to bring the pile P toward the free parking cell 3 further downstream, such as to move by one position all the other piles P already present in the level 2A and to dispense in outlet the last pile P downstream, respecting the predetermined cadence.

FIG. 6 illustrates the upper storage level 2A in the special optional functioning mode which includes using also the drawing means 210A, 230A, respectively corresponding to the relative inlet 21A and outlet 23A tracts, as further parking cells; naturally this mode, if activated, likewise relates also the lower storage level 2B.

It is clear that the mode enables, as already mentioned, increasing the capacity of the buffer 1 given same volumes of operation.

The pile P following the pile sent to the upper storage level 2A is directed towards the lower level 2B by the switcher means 20, switched into the raised position H thereof (FIG. 7B).

The electronic managing and command means 10 pilot the flow of the piles P present therewith with the same logic as already described with reference to the upper storage level 2A.

Obviously the electronic managing and command means 10 are appropriately interfaced with the processor and the software managing the machine M, so that suitable corrective actions can be introduced in real time on the operating means upstream of the buffer 1 and/or on the continuous stuffing system velocity C, when certain conditions obtain, with the aim of guaranteeing the regularity of supply of the piles P.

For example, the stuffing system C can be gradually slowed, and therefore the dispensing cadence of the buffer 1, if the store of piles P present therein tends to run out due to a prolonged sequence of piles P in inlet with many sheets, and therefore necessarily slower.

On the contrary, the stuffing system C can be gradually accelerated or, alternatively, the cutting station ST slowed down, in the presence of a prolonged sequence of piles P with few sheets, which might saturate the buffer 1.

Tendentially the standard velocity which is set for the stuffing system C, taking account of the autonomy of the buffer 1 and the sequence of piles on the reel, is such as not to require the above-mentioned variations in velocity, which in any case, if necessary, are few in the whole work context of each reel, with limited variations with respect to the standard velocity.

The functioning modes described above for piles P in C5 format are almost the same even in the case of piles P in DL format with folded sheets, for which both the storage station SA of the sheets F and the folding station SP externally of the buffer 1 are included, upstream thereof.

Figure 9:
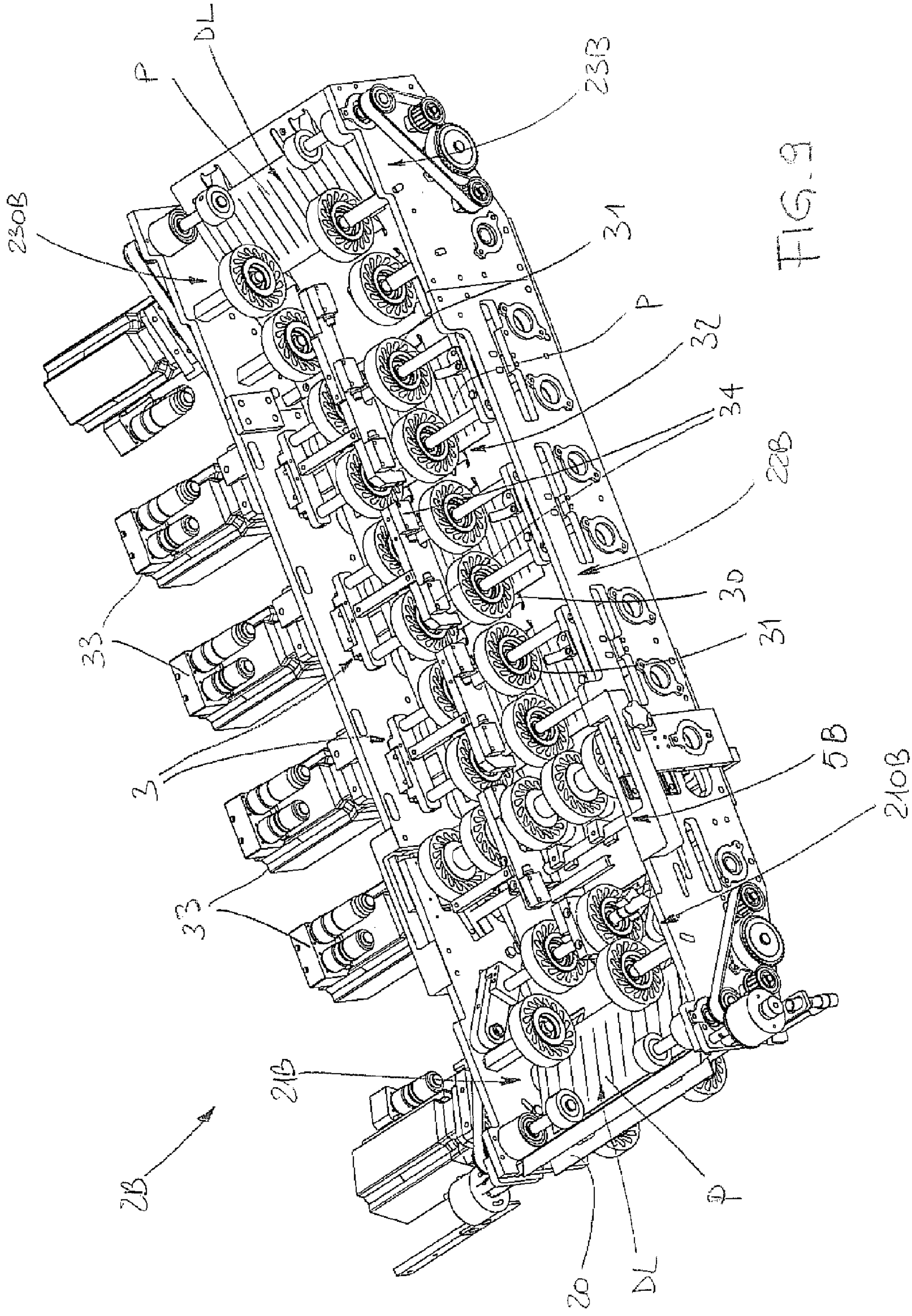
FIG. 9 is an axonometric view showing the lower storage level of the buffer, in which DL format piles are present.
Figure 10:
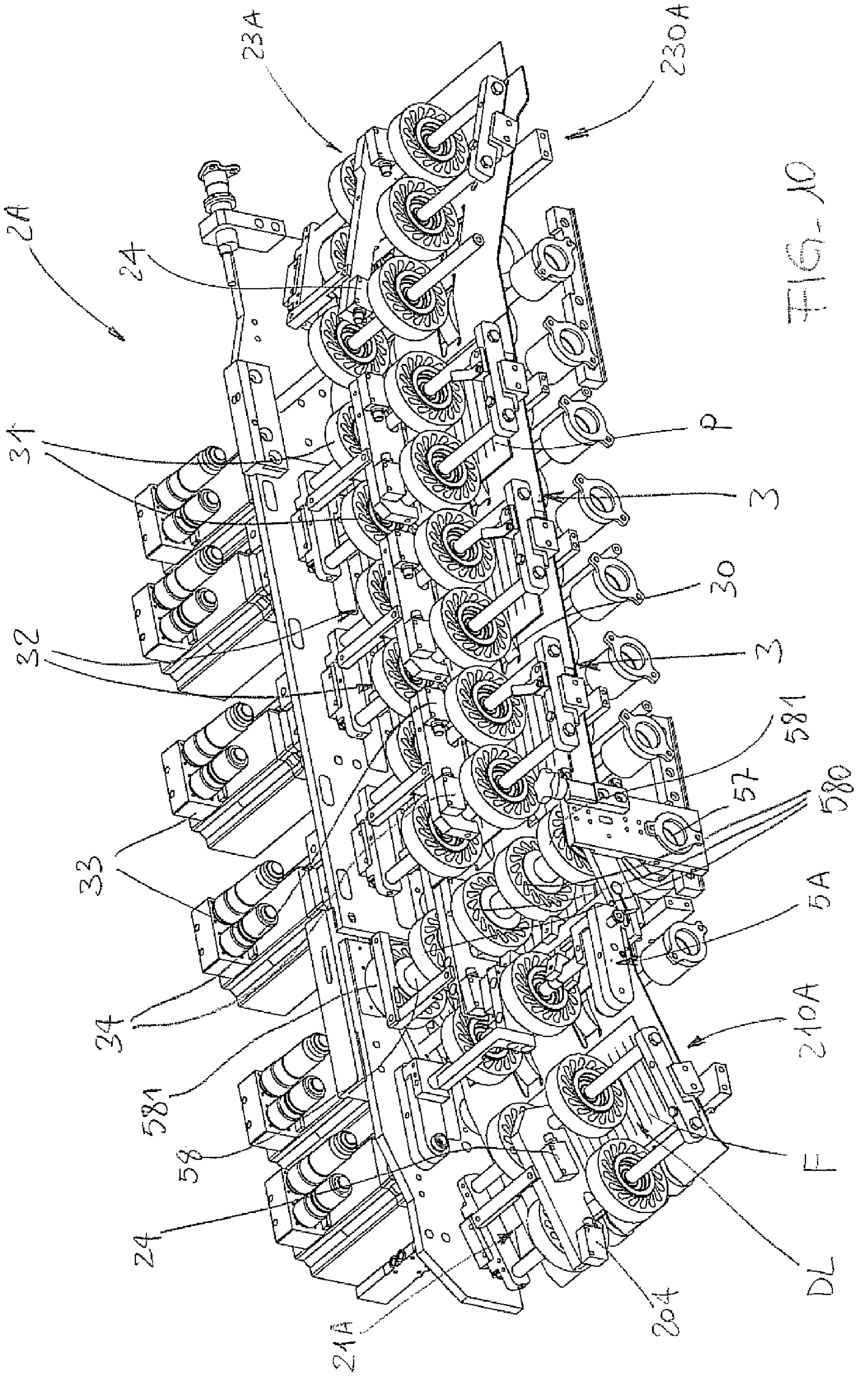
FIG. 10 is an axonometric view of an upper storage level of the buffer, in which DL format piles are present.

The functioning will not be described again here, the only differences being due to the fact that the smaller longitudinal dimension of the piles P in DL format enables containing a greater number thereof, given a same volume of the buffer 1, with a different arranged in the various parking cells 3, determined appropriately by the electronic managing and command means 10 (FIGS. 9, 10).

If the storage stations 5A, 5B are included internally of the buffer 1, they are inoperative as regards the formation of the piles P; however, the relative lower drive rollers 50 and upper idle rollers 51 are activated in appropriate phase relation for transporting the piles P and are arranged in the described advanced position in such a way as not to abandon the grip of the piles P before they are delivered to the roller transport group 56.

A further functioning mode of the buffer 1 is now described, in the upper 2A and lower 2B storage levels of respective buffering stations 5A, 5B destined for the formation of piles P of DL format with cut sheets.

With the buffer 1 thus-constructed the configuration of the machine M which results is illustrated in FIG. 8, in which the cutting station ST is included, with the relative longitudinal and transversal cutting group, located flanked to the inlet of the buffer 1.

In this case too a first preliminary step is required, which includes:

- establishing the operating velocity to be set for the continuous stuffing system C, by calibrating it according to the already-indicated parameters;
- setting the electronic managing and command means 10 according to the form a DL, the formation of the piles P in the storage stations 5A, 5B and the outlet cadence thereof, measured together with the operating velocity selected for the stuffing system C;
- regulating, in the advance position thereof, the lower drive rollers 50 and the upper idle rollers 52 of the storage stations 5A, 5B;
- preparing, at a lower velocity, a number of piles P sufficient to fill the buffer 1 downstream of the storage stations 5A, 5B as well as the portion of line up to the inlet of the stuffing system C.

At this point, as in the preceding case, the machine M can be started up and brought, with a gradual and synchronised acceleration of all the components thereof, to the standard predetermined velocity.

The single sheets F, coming from the cutting station ST, reach the inlet of the buffer 1 with a constant cadence, signalled by the detecting means 204.

Figure 12B:
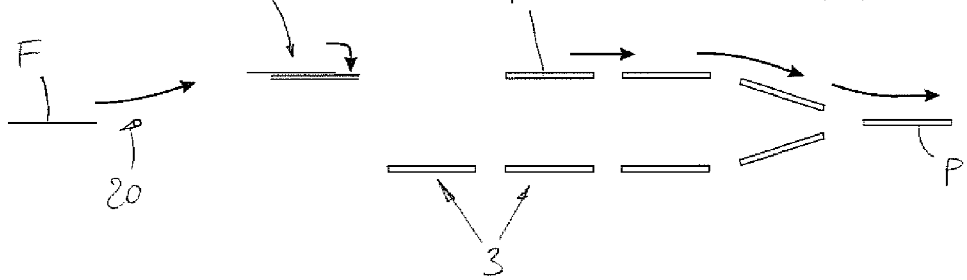
Figure 12C:
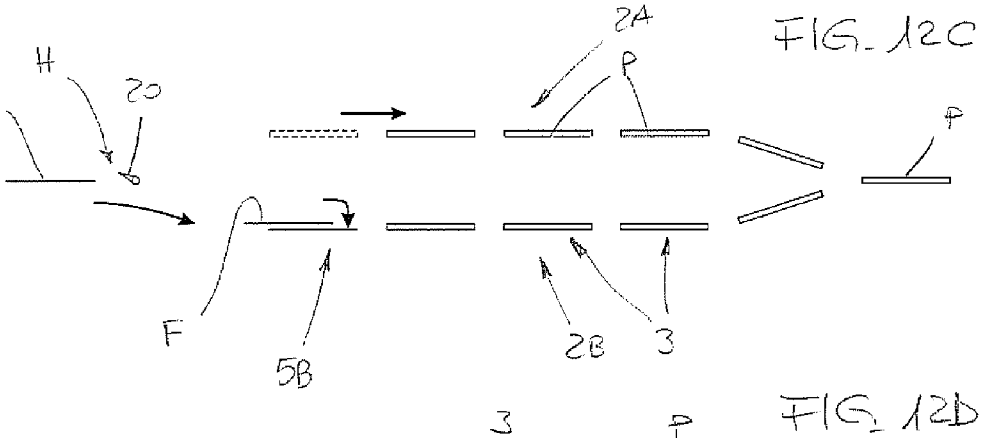
Figure 12D:
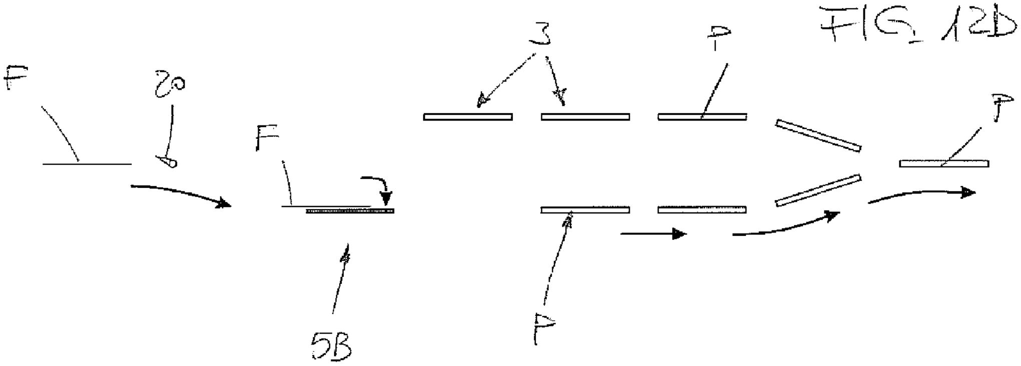

The electronic managing and command means 10 maintain the switcher means 20 in the lowered position D thereof, or in the raised position thereof H, such that all the sheets F destined to constitute a pile P are directed, respectively, towards the upper storage level 2A (FIGS. 12A, 12B) or towards the lower storage level 2B (FIGS. 12C, 12D).

The operating means of the corresponding storage stations 5A or 5B are activated in phase relation so that the sheets F, gradually gripped between the respective lower drive roller 50 and upper idle roller 52 and pushed thereby reach the tray 52, with the aid of the elastic plates 53 (see in particular FIG. 11).

After the inlet into the buffer 1 of the last sheet F destined to complete the pile P, the switcher means 20 are immediately switched into the other position thereof, so that the next sheet F in arrival, belonging to a new pile P, can be directed into the other storage station of the remaining storage level.

This enables the carriage 55 bearing the tray 52 to be advanced to deliver the pile P thus-realised to the roller transport group 56, maintaining the respective sheets F aligned, as explained in the foregoing.

From this group 56, by maintaining the grip, the pile P is sent to the parking cell 3 immediately downstream, without interrupting the inlet to the buffer 1 of the sheets F.

During the formation of the piles P, in one or the other of the storage stations 5A, 5B, the electronic managing and command means 10 dispense the piles P in outlet from the buffer with the requested cadence, removing them alternatively from the parking cells 3 of the upper storage level 2A and the lower storage level 2B (FIGS. 12B, 12D).

For the functioning mode described above, if necessary the corrective actions already specified for the C5 format are also included, for the same purpose of guaranteeing a regular supply of the piles P to the stuffing system C.

Apart from the indicated functioning modes, given as example, there can be others besides, differing in regard to the flow of piles P internally of the buffer 1, obtainable with suitable programs associated to the electronic managing and command means 10, all suitable for dispensing the piles P with the required constant cadence.

The invention claimed is:

1. A dynamic buffer for a continuous envelope stuffing system, of a type for supplying piles formed by one of more sheets to the stuffing system, the sheets coming from a cutting station provided in a supply line arranged upstream, the continuous stuffing system being of a type in which a film of flexible material is unwound, supplied stretched on a horizontal plane such as to receive thereon a sequence of the piles, and then progressively wound in a tube fashion in order to wrap the piles and subsequently cut in spaces separating each of the piles from a next pile, the buffer being comprising: at least a storage level, comprising a plurality of parking cells, arranged in series, suitable for receiving, retaining and dispensing the piles, within each cell being provided: at least two lower rollers having horizontal axes that are parallel and distanced by an amount which is less than a dimension of the piles and parallel to the advancement direction, the lower rollers being synchronously motorized, independently of the lower rollers of remaining parking cells; at least two upper rollers, idle on axes thereof, each of which is suitable for forming, with the corresponding lower rollers, a roller-counter-roller pair able to adheringly grip and draw one of the piles; sensor means suitable for detecting whether each parking cell is free or occupied by one of the piles; an electronic managing and command unit, suitable to receive the signals supplied by the sensor means of each parking cell and to pilot a flow of the piles in inlet to the storage level up to bringing each of the piles to a most downstream parking cell, transferring the piles to the successive cells and finally allowing exit of the piles from the storage level, the electronic managing and command unit acting in phase relation with the cutting station and the stuffing system, such that the supplying of the piles thereto is done with a cadence that is proportional to an operating velocity thereof, wherein two superposed storage levels are provided, respectively an upper level and a lower level, and switcher means positioned upstream thereof, destined to direct the piles in inlet towards one or another of the storage levels, wherein a buffering station is located in each of the superposed storage levels upstream of the relative parking cells, which buffering station is suitable for receiving a predetermined succession of single sheets, supplied in inlet to the buffer, for superposing the sheets in order to form a corresponding pile, and for transferring the pile to the parking cell situated immediately downstream, and wherein each of the storage stations comprises: at least a lower drive roller, coupled to at least an idle upper roller, for sending sheets in arrival to a tray arranged at a lower level with respect to the level with which the rollers engage the sheet; elastic plates, suitable for directing the sheets in arrival in a downwards direction and for maintaining the pile in formation on the tray; sensor means suitable for detecting arrival of each of the sheets and sending a corresponding signal to the electronic managing and command unit; a carriage, which bears the tray made horizontally mobile between a retracted position in chase relation with the formation of the pile, and an advanced position, for delivery of the pile once it is completed; a roller transport group arranged downstream of the tray, suitable for receiving the just-complete pile and for transferring the said pile to the parking cell immediately downstream, maintaining unaltered the reciprocal position of the sheets making up the pile.

2. The dynamic buffer of claim 1, wherein the upper storage level comprises: a rising inlet tract in which drawing means are provided; a horizontal tract along which the parking cells are distributed in succession; and a descending outlet tract, in which drawing means are provided.

3. The dynamic buffer of claim 1, wherein the lower storage level comprises: a descending inlet tract in which drawing means are provided; a horizontal tract along which the parking cells are distributed in succession; a rising outlet tract in which drawing means are provided.

4. The dynamic buffer of claim 1, wherein the switcher means are constituted by a deflector that is hinged according to a horizontal axis that is transversal to the arrival direction of the piles, and is made mobile by action of the actuator means between a raised position in which the piles are directed towards the lower storage level, and a lowered position in which the piles are directed towards the upper storage level.

5. The dynamic buffer of claim 1, wherein detecting means are associated to the switcher means, which detecting means are destined to signal arrival of a pile at the inlet of the buffer, and to send a corresponding signal to the electronic managing and command unit.

6. The dynamic buffer of claim 1, wherein the upper rollers exhibits an elastically yielding structure in a radial direction, suitable for absorbing a difference of thicknesses between a pile and another.

7. The dynamic buffer of claim 1, wherein between the roller-counter-roller pair arranged more downstream in a parking cell and a roller-counter-roller pair arranged more upstream of a next parking cell, there is an interaxis that is smaller than a longitudinal development of the piles.

8. The dynamic buffer of claim 2 wherein the drawing means, respectively present in the inlet tracts and outlet tracts, are constituted by roller and counter-roller systems and in that the drawing means to which relative sensor means are associated, provided in order to send a corresponding signal to the electronic means of managing and command, are destined to receive, retain and dispense the piles, in a same way as the parking cells.

9. The dynamic buffer of claim 8, wherein in the roller and counter-roller systems, defining the drawing means, one of the roller and counter-roller systems is motorized and the other is idle, and in that the idle roller and counter-roller systems exhibit an elastically yielding structure in a radial direction, destined to absorb differences of thickness existing between a pile and another.

10. The dynamic buffer of claim 1, wherein the lower drive roller and the upper idle roller are borne by a common support that is horizontally adjustable, in order to define two positions for the rollers, respectively: a retracted position, in which a free space comprised between the rollers and the roller transport group located downstream has a length which is greater than the dimension in the advancement direction of a pile having a minimum format and smaller than the corresponding dimension of a pile of a maximum format;

an advanced position, in which the free space comprised between the rollers and the roller transport group has a shorter length than a dimension, according to the advancement direction, of a pile of a minimum format.

11. The dynamic buffer of claim 1, wherein the transport group comprises: a lower drive shaft, on which two lower central rollers are keyed, suitable for acting below the pile, and at least a transmission roller external of the pile; an upper drive shaft parallel to the lower drive shaft, on which upper central rollers are keyed, arranged at the lower central rollers and destined to act above the pile, and at least an upper transmission roller, destined to receive drive from the lower transmission roller and to activate in rotation the upper shaft, as well as the upper central rollers in an opposite direction and with a transmission ratio that is alike with respect to the rollers of the lower shaft and the lower central rollers.

12. The dynamic buffer of claim 4 wherein detecting means are associated to the switcher means, which detecting means are destined to signal arrival of a pile at the inlet of the buffer, and to send a corresponding signal to the electronic managing and command unit.

13. The dynamic buffer of claim 3, wherein the drawing means, respectively present in the inlet tracts and outlet tracts, are constituted by roller and counter-roller systems and in that the drawing means to which relative sensor means are associated, provided in order to send a corresponding signal to the electronic means of managing and command, are destined to receive, retain and dispense the piles, in a same way as the parking cells.

* * * * *